No. 839,821. PATENTED JAN. 1, 1907.
A. DUMONT.
LOCK BOLT.
APPLICATION FILED MAR. 1, 1906.
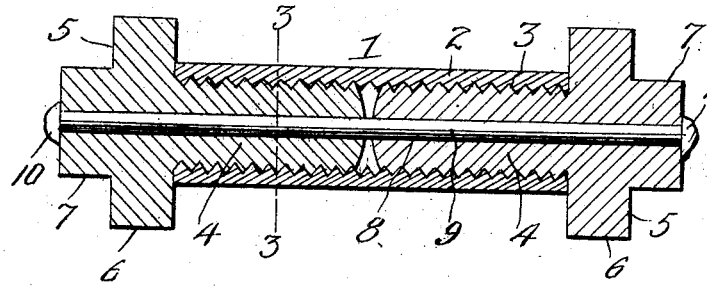
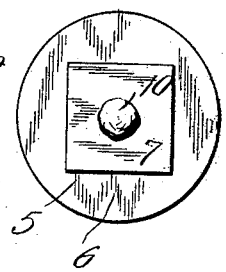
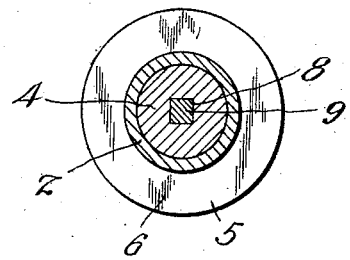
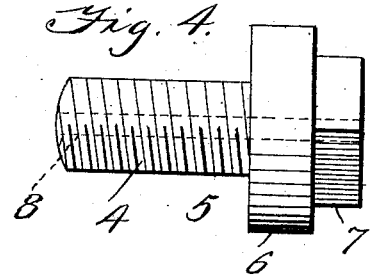
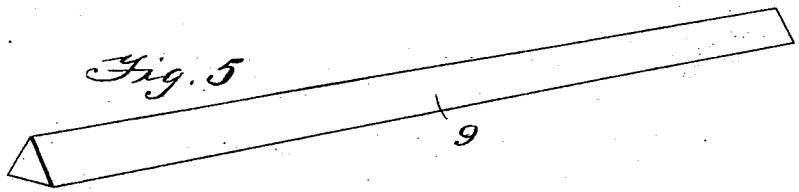
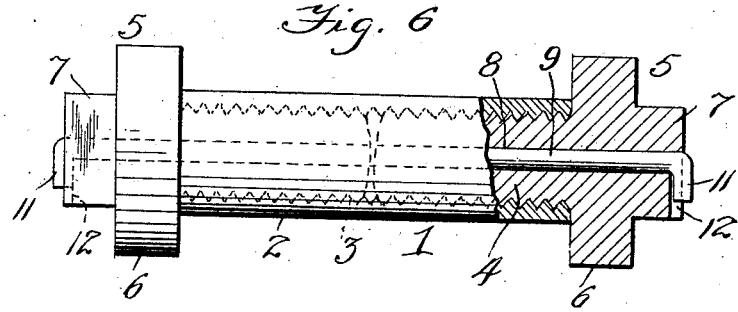
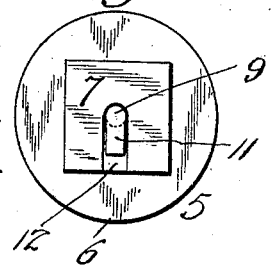
Witnesses
Chas. L. Griesbauer.
C. N. Griesbauer.
Inventor
Albert Dumont
by H. B. Willson & Co.
Attorneys

UNITED STATES PATENT OFFICE.

ALBERT DUMONT, OF DETROIT, MICHIGAN.

LOCK-BOLT.

No. 839,821.　　　Specification of Letters Patent.　　　Patented Jan. 1, 1907.

Application filed March 1, 1906. Serial No. 303,694.

*To all whom it may concern:*

Be it known that I, ALBERT DUMONT, a citizen of the United States, residing at Detroit, in the county of Wayne and State of Michigan, have invented certain new and useful Improvements in Lock-Bolts; and I do declare the following to be a full, clear, and exact description of the invention, such as will enable others skilled in the art to which it appertains to make and use the same.

My invention relates to improvements in lock-bolts; and it consists in the novel construction, combination, and arrangement of parts hereinafter described and claimed.

The object of the invention is to provide a device of this character which will be of simple, strong, and durable construction and in which it will be impossible for the nut or nuts to work loose when once locked.

The above and other objects, which will appear as the nature of my invention is better understood, are accomplished by means of the construction illustrated in the accompanying drawings, in which—

Figure 1 is a longitudinal sectional view through my improved lock-bolt, showing the parts in their engaged or locked positions. Fig. 2 is an end view of the same. Fig. 3 is a transverse section taken on the line 3 3 in Fig. 1. Fig. 4 is a side view of one of the nuts. Fig. 5 is a perspective view of a triangularly-shaped locking bar or rod. Fig. 6 is a view similar to Fig. 1, showing a slightly-modified form of the invention; and Fig. 7 is an end view of the same.

Referring to the drawings by numeral, 1 denotes my improved lock-bolt, which comprises a tubular body 2, internally screw-threaded, as at 3, to receive similar threads formed externally on the shanks or stems 4 of a pair of nuts 5. The latter have large circular heads 6, from the inner faces of which project the concentric shanks or stems 4 and upon the other and outer faces of which are formed reduced portions or projections 7, of square or other polygonal form, to permit them to be readily engaged by wrenches, so that the nuts may be screwed into the opposite ends of the body 2 to clamp the object or objects through which the body 2 extends between the large heads 6 of the nuts. The nuts are formed with longitudinally-extending openings or bores 8, which are preferably of polygonal form in cross-section, so as to receive a similarly-shaped locking-bar 9, which passes entirely through the device and is adapted to have its ends headed, as shown at 10, to retain it in position and lock the nuts in the tubular body 2. As shown in the first four figures of the drawings, the locking rod or bar 9 is square in cross-section, and in Fig. 5 a triangularly-shaped locking-bar is shown. If desired, however, said bar may be of cylindrical form, as shown in Figs. 6 and 7 of the drawings, in which case its ends are preferably bent at right angles, as shown at 11, into transverse grooves 12, formed in the outer faces of the portions 7 of the nuts, as shown.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A device of the character described comprising a tubular body, nuts screwed to the ends thereof and each having a longitudinal bore, and a locking-bar extending through said body and the bores of the nuts and engaged with the latter to prevent rotation thereof.

2. A device of the character described comprising a tubular body, nuts screwed upon the ends thereof and having longitudinal bores or openings, and a locking-bar passed through said body and said bores or openings, and having its ends engaged with the nuts to lock said parts together.

3. A device of the character described comprising a tubular internally-screw-threaded body, nuts having enlarged heads, externally-screw-threaded stems to enter the ends of said body, polygonal-shaped outer portions and longitudinal bores or openings, and a locking-bar passed through said body and the bores of said nuts and having its ends upset to lock the nuts in said body, substantially as described.

In testimony whereof I have hereunto set my hand in presence of two subscribing witnesses.

ALBERT DUMONT.

Witnesses:
CLAUDE MORISETT,
SILAS DUMONT.